(12) United States Patent
Varghese et al.

(10) Patent No.: US 11,687,948 B2
(45) Date of Patent: Jun. 27, 2023

(54) ADJUSTING WEIGHTS OF WEIGHTED CONSENSUS ALGORITHMS FOR BLOCKCHAINS

(71) Applicant: PayPal, Inc., San Jose, CA (US)

(72) Inventors: Prasanth Mathew Varghese, Chennai (IN); Sindhu Pasumarthy, Chennai (IN)

(73) Assignee: PAYPAL, INC., San Jose, CA (US)

( * ) Notice: Subject to any disclaimer, the term of this patent is extended or adjusted under 35 U.S.C. 154(b) by 477 days.

(21) Appl. No.: 16/820,365

(22) Filed: Mar. 16, 2020

(65) Prior Publication Data

US 2021/0287228 A1 Sep. 16, 2021

(51) Int. Cl.
*G06Q 30/018* (2023.01)
*G06N 20/00* (2019.01)
*G06F 16/23* (2019.01)
*G06Q 50/00* (2012.01)

(52) U.S. Cl.
CPC ..... *G06Q 30/0185* (2013.01); *G06F 16/2379* (2019.01); *G06N 20/00* (2019.01); *G06Q 50/01* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 2014/0173066 A1 | 6/2014 | Newton et al. | |
| 2014/0173115 A1 | 6/2014 | Varney et al. | |
| 2015/0207695 A1 | 7/2015 | Varney et al. | |
| 2017/0232300 A1 | 8/2017 | Tran et al. | |
| 2018/0121909 A1* | 5/2018 | Christidis | G06Q 20/383 |
| 2020/0027089 A1* | 1/2020 | Kuchar | G06Q 20/4016 |
| 2020/0126116 A1* | 4/2020 | Smith | G06Q 30/0248 |
| 2020/0134613 A1* | 4/2020 | Jiang | G06Q 20/3825 |
| 2020/0134656 A1* | 4/2020 | Padmanabhan | H04L 9/0637 |
| 2020/0142905 A1* | 5/2020 | Jain | G06F 16/27 |
| 2020/0372154 A1* | 11/2020 | Bacher | H04L 41/145 |
| 2021/0119785 A1* | 4/2021 | Ben-Reuven | H04L 63/126 |

OTHER PUBLICATIONS

International Application No. PCT/US2021/019191, International Search Report and Written Opinion dated May 11, 2021, 17 pages.

* cited by examiner

*Primary Examiner* — Chrystina E Zelaskiewicz
(74) *Attorney, Agent, or Firm* — Haynes and Boone, LLP

(57) ABSTRACT

Systems and methods are described for adjusting decision reliability scores (e.g., weights) in weighted consensus algorithms for blockchains include accessing broadcast events in a blockchain, where the broadcast events correspond to a historic period of time. A broadcast decision provided by a participant in the blockchain for each of the broadcast events may be identified. A consensus decision for each of the broadcast events may be identified where the consensus decision indicates whether there is a consensus among participants in the blockchain that a corresponding broadcast event should be added as a new node to the blockchain. A success rate may be calculated for the participant based the identified broadcast decision provided by the participant for each of the broadcast events and the identified consensus decision for each of the broadcast events. Based on the success rate, the decision reliability score for the participant may be increased, decreased, or maintained.

20 Claims, 8 Drawing Sheets

132

| ID | Sanctioned Name | Source | User | Time Posted | User Verified |
|---|---|---|---|---|---|
| 1 | John Smith | Twitter | Fox News | February 2 | True |
| 2 | John Smith | Facebook | India Today | February 2 | True |
| 3 | Jane Doe | Facebook | Fake News | February 2 | True |

| ID | Sanctioned Name | Source | User | Time Posted | User Verified |
|---|---|---|---|---|---|
| 1 | John Smith | Twitter | Fox News | February 2 | True |
| 2 | John Smith | Facebook | India Today | February 2 | True |

Fig. 1D

ADJUSTING WEIGHTS OF WEIGHTED CONSENSUS ALGORITHMS FOR BLOCKCHAINS

TECHNICAL FIELD

The present disclosure generally relates to computer security and more particularly to utilizing machine intelligence to analyze online digital content in real time to identify sanctionable individuals or entities according to various embodiments. This disclosure also includes blockchain related embodiments that describe consensus weighting mechanisms, particularly in regard to scoring and penalization schemes, which may be applied generally and also within the context of identifying sanctionable individuals or entities.

BACKGROUND

Regulatory entities typically have a list of sanctioned individuals and/or entities with whom regulated individuals or entities may not conduct transactions. However, the time that it takes to update and distribute such lists is generally slow. Bad actors can take advantage of the slow updates and distributions of lists by performing transactions online before the lists are updated and distributed to the regulated individuals or entities. By doing this, the bad actors are sometimes able to avoid being blocked from performing transactions. The regulated individuals or entities can result in costly penalties and fees imposed by the regulatory entities for permitting the bad actors to use their services in performing transactions. With the growing volume of transactions being performed online, there is a need for an improvement in the field of computer security and machine intelligence to identify the bad actors in real-time and block them from unauthorized use of online computer systems.

BRIEF DESCRIPTION OF THE FIGURES

FIGS. 1C and 1D illustrate a data table stored in a data store in accordance with one or more embodiments of the present disclosure.

Figure 1A:
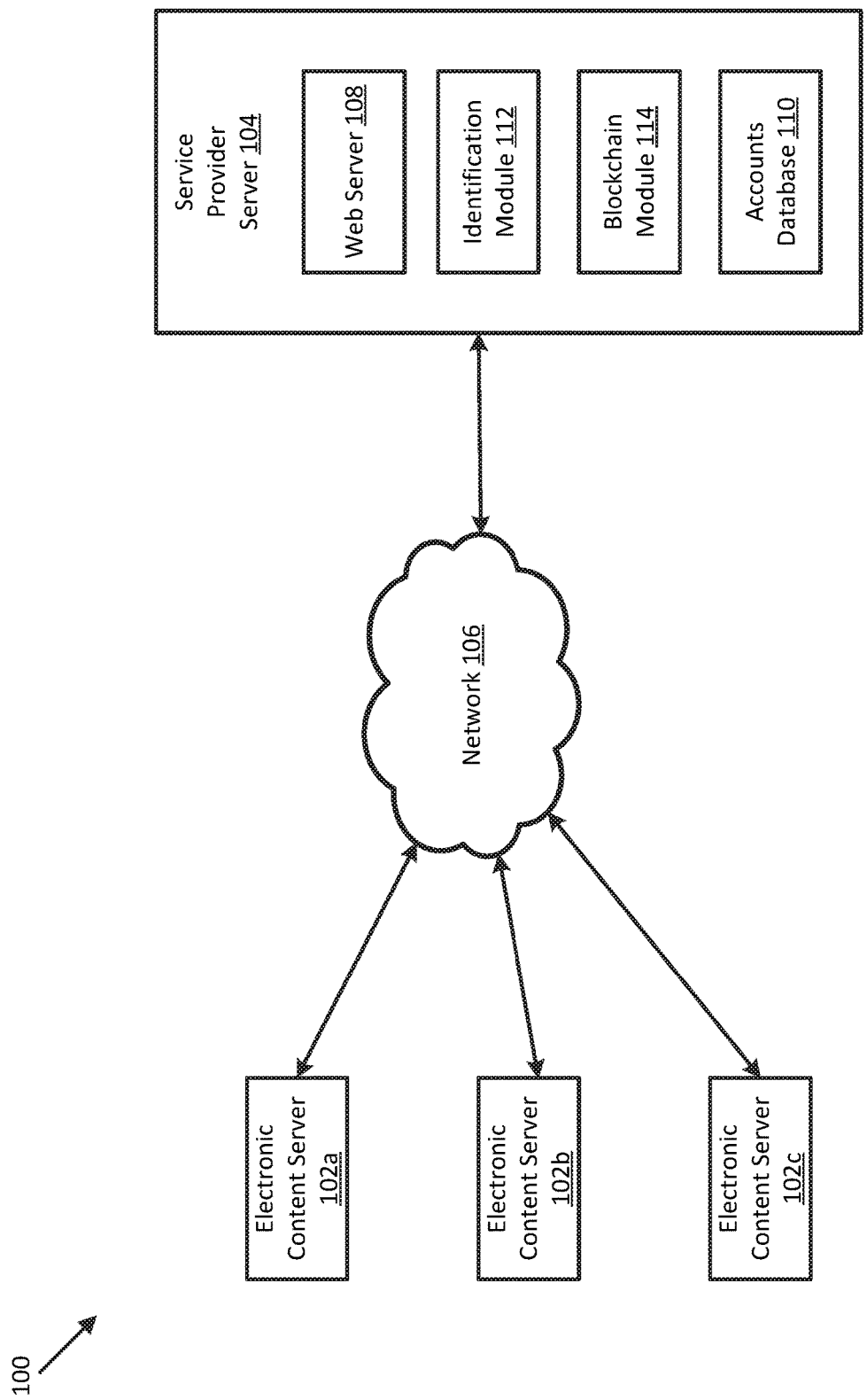
FIG. 1A illustrates a block diagram of a networked system suitable for implementing one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure describes systems and methods for identifying a sanctioned individual using machine intelligence to analyze electronic content from a plurality of sources. In an embodiment, a system monitors electronic content sources. Using a trained sentiment analysis machine learning classifier, the system may determine a classification for a particular content item from the electronic content sources. In response to the determined classification being associated with sanctionable conduct, the system may identify, based on an electronic textual analysis of a user-authored text of the particular content item, one or more individual names within the particular content item. The system may electronically store, in a database table, an indication that the one or more individual names have been identified as individuals who may be subject to one or more sanction requirements that prohibit one or more types of electronic transactions. In some embodiments, additional metadata from the particular content item may be stored along with the indication of the one or more individual names. A confidence score may be calculated for the one or more individual names based on other data that is collected from other electronic content items. For example, the data store may contain a plurality of different instances where the one or more individuals was identified from different electronic content items and/or different electronic content sources. As such, the present disclosure describes a system that allows for real-time identification of sanctionable persons by streaming data from disparate sources where the data may be aggregated and used in a holistic analysis to determine whether an individual is associated with sanctionable conduct. In some embodiments, sanctionable conduct may be financial crimes, country-specific crimes, and other conduct that may lead to an individual or individuals being placed on the Specially Designated Nationals (SDNs) list, which lists people, organizations, and vessels with whom U.S. citizens and permanent residents are prohibited from doing business.

Although the present description describes individuals and names of individuals, in various embodiments, individuals may also include organizations, entities, and/or artificial intelligence (e.g., bots or other computerized entities or systems acting as individuals).

The present disclosure additionally describes blockchain systems and methods that may be used in auditing blockchain participants to adjust decision reliability scores used in a weighted consensus algorithm for the blockchain. In an embodiment, a system may access broadcast events in a blockchain where the broadcast events correspond to a historic period of time for the blockchain. The system may identify a broadcast decision provided by a participant in the blockchain for each of the broadcast events. The system may further identify a consensus decision for each of the broadcast events where the consensus decision indicates whether there is a consensus among participants in the blockchain that a corresponding broadcast event should be added as a new node to the blockchain. The system may calculate a success rate for the participant based on the identified broadcast decision provided by the participant for each of the broadcast events and the identified consensus decision for each of the broadcast events. Based on the calculated success rate, the system may increase or decrease a decision reliability score for the participant where the decision reliability score comprises a weight applied to broadcast decisions provided by the participant in future broadcast events for the blockchain. Each participant in the blockchain may have its decision reliability score adjusted as needed to correlate to the participant's accuracy in the blockchain. According to various embodiments, subsequent to increasing, decreasing, or maintaining the decision reliability score for each of the participants to the blockchain, the system may determine that a greatest reliability score among the participants is less than a maximum (e.g., ceiling) reliability score. In such cases, the system may increase the decision reliability score for each participant by an amount equal to a difference between the greatest reliability score and the maximum reliability score. Thus, the present disclosure provides a fault tolerant mechanism for achieving an agreement on a single data value or a single state of the network among distributed computer processes or multi-agent computer systems such as blockchain systems.

In some embodiments, participants may include artificial intelligence such as bots or other computerized entities or systems acting as or on behalf of individuals, entities, service providers, etc.

FIG. 1 illustrates a networked system 100 according to one or more embodiments of the present disclosure. System 100 includes a service provider server 104 that is communicatively coupled with various electronic content servers 102a-102c (e.g., social media servers and web servers) via a network 106. Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, network 160 may comprise a wireless telecommunications network (e.g., cellular phone network) adapted to communicate with other communication networks, such as the Internet.

Each of electronic content servers 102a-102c may be configured to maintain a social media platform in some embodiments. Example social media platforms include Twitter®, Facebook®, Instagram®, Snapchat®, Tumblr®, LinkedIn®, WhatsApp®, Pinterest®, Reddit®, YouTube®, Twitch®, SoundCloud®, Yelp®, News Websites, and similar electronic content producing media platforms. In some embodiments, after a user has registered an account with a social media platform, the user may begin to submit online posts and receive feeds of online posts generated by other users (e.g., posts generated by friends, connections, subscription channels and message threads) through the social media platform. As such, each social media server is configured to maintain and manage feeds of online posts and facilitate generation and presentation of the online posts. It is noted that while only three electronic content servers are shown in FIG. 1, service provider server 104 may be connected with as many (or as few) electronic content servers via network 106 as necessary or desired to perform the functions described herein.

According to some embodiments, service provider server 104 includes a web server 108, an accounts database 110, an identification module 112, and a blockchain module 114. Web server 108 may be configured to process hypertext transfer protocol (HTTP) requests. When web server 108 receives an HTTP request, web server 108 may collect web content in response to the request. Although only one web server 108 is shown in FIG. 1, it will be appreciated that service provider server 104 may be connected to as many (or as few) web servers as necessary or desired via the network 106 to perform the functions described herein.

Service provider server 104, according to some embodiments, may be maintained by an online service provider, such as PayPal, Inc. of San Jose, Calif., which may provide services related to detection and identification of sanctionable individuals or entities including maintaining a permissioned blockchain with controlled access provided to various participants.

According to one or more embodiments of the present disclosure, identification module 112 may be configured to perform the automated identification functionalities as described herein. For example, identification module 112 may include machine learning models configured to perform various tasks as discussed herein where the machine learning models may be regularly trained to improve output accuracy over time.

In some embodiments, blockchain module 114 may be configured to communicatively couple to a blockchain network and perform automated functionalities as described herein.

According to one or more embodiments, accounts database 110 may store information related to user accounts that were registered with the service provider server 104. The information of a user account stored in accounts database 110 may include a user name, a password (or other types of authentication credentials such as fingerprint information), contact information (resident address, including country, state, city, zip code), other personal information of the user, transaction history related to the user account, available funds of the user account, and other user account related information. Service provider server 104 may include other applications and may also be in communication with one or more external databases (not shown), that may provide additional information to be used by the service provider server 130. In some embodiments, the one or more external databases may be databases maintained by third parties, and may include third party account information of users who have user accounts with service provider server 104.

Figure 1B:
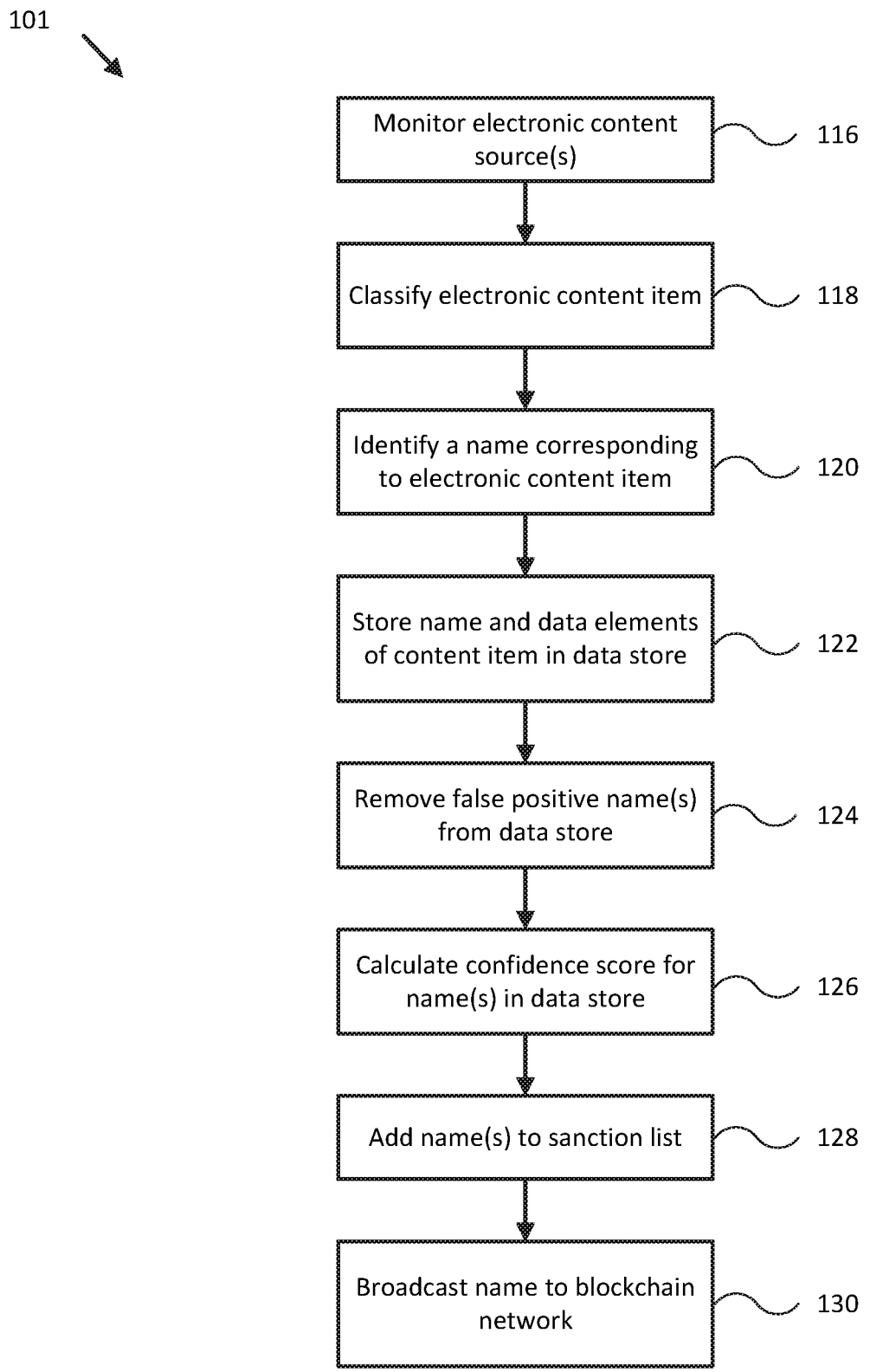
FIG. 1B illustrates a flow diagram of a process for identifying sanctionable persons based on electronic content sources in accordance with one or more embodiments of the present disclosure.

FIG. 1B illustrates a flow diagram of a process 101 for identifying sanctionable individuals in accordance with one or more embodiments of the present disclosure. For explanatory purposes, process 101 is primarily described herein with reference to FIGS. 1A, 1C and 1D; however, process 101 is not limited to such figures. The operations of process 101 are described herein as occurring in serial, or linearly (e.g., one after another). However, multiple operations of process 101 may occur in parallel. In addition, the operations of process 101 need not be performed in the order shown and/or one or more of the operations of process 101 need not be performed. In various embodiments, one or more operations of process 101 may be performed by service provider server 104, or any other computer system. In some embodiments, service provider server 104 may execute all operations indicated in FIG. 1B, while in other embodiments, all or part of one or more operations may be omitted.

At operation 116, a system may monitor one or more electronic content source(s) (referred to variously herein as electronic content source(s)). For example, to monitor the electronic content source(s), the system may include a streaming application programming interfaces (API) module configured to communicate with an API corresponding to one or more electronic content servers (such as electronic content servers 102a-102c) for streaming real-time electronic content from platforms (e.g., social media platforms) running on the electronic content servers. In some embodiments, the streaming API module may be part of identification module 112 of FIG. 1. In an embodiment, a Hadoop cluster may be utilized for collecting and analyzing the data from the electronic content sources. In some embodiments, Kafka may be utilized to collect the data from the electronic content sources. In some implementations, Kafka may be used to feed the Hadoop cluster. For example, Kafka may be used as a pipeline that collects data from the electronic content sources in real-time and pushes such to the Hadoop cluster, where Hadoop cluster may process and store the data.

Examples of electronic content include online posts generated and posted through user accounts registered to a social media platform. The online posts may include user-authored/user-generated posts, status updates, tweets, videos, messages, images, comments, threads, blog posts, digital news articles, or any other digital content item associated with a social media platform. Thus, an electronic content source may be any website and/or computer service platform that provides such content. Electronic content may include content posted through non-social media platforms as well—for example, a news website such as those provided by the Wall Street Journal™, CNN™, etc. may be an electronic content source. Accordingly, in various embodiments, electronic content that is monitored is not necessarily linked to a specific registered user account of a social media platform.

In some embodiments, real-time monitoring may be substantially close to the time that an event occurs (e.g., within the last five seconds, within the last two minutes, two hours, or some other specified time frame). As such, the streaming API module enables the system to continuously detect and receive online posts almost immediately as new online posts are posted on a social media platform. A real-time social media feed may include one or more online posts. It is noted that an electronic content item such as an online post may include information related to a user account with the electronic content server that generated the online post as well as additional information related to the online post. For example, an online post may be a tweet that includes metadata such as a timestamp, time zone, tweet identification number, user-authored string text of the tweet, user identification number, user account screen name, user account holder name, user location (e.g., GPS location) at time of tweet, user location at time of generation of the user-generated portion of tweet (e.g., location where video or image in tweet was captured), tweet URL, whether account is a verified user, follower count, friends count, favorites count, retweets/favorites count, language of tweet, and/or user account profile image.

At operation 118, the system may classify an electronic content item obtained from an electronic content source. For illustrative purposes reference is made herein to one electronic content item, however, the system may classify more than one electronic content item obtained from each of the electronic content sources.

The system may classify the electronic content item using a trained sentiment analysis machine learning classifier. For example, the trained sentiment analysis machine learning classifier may be trained using reference electronic content items from various electronic content sources (e.g., training datasets). The reference electronic content items may have been labeled as either containing sanctionable sentiment or not containing sanctionable sentiment to facilitate the training. In this regard, a machine learning model fed a substantial number of text documents containing pre-tagged examples may learn to automatically detect sentiment analysis in future documents post-training. For example, in one implementation, 25,000 labeled tweets may be used in supervised training of a classifier so that the classifier may learn what tweets contain sanctionable conduct. In some cases, the tweets may be cleaned and prepared for the training as training data sets by, for example, removing stop words or words that are not relevant for learning sentiment of the tweet. In other cases, tweets are not cleaned so that the classifier does not become biased in learning sentiment.

In an embodiment, electronic content items streamed from the electronic content sources may be stored as part of training data sets. Broadcast decisions and consensus decisions as further discussed below may be combined with the electronic content items streamed from the electronic content sources to create new training data sets from which the sentiment analysis machine learning classifier may learn. In this regard, a feedback loop may be used to retrain the classifier using blockchain. As an illustrative example, individual names broadcasted out to the blockchain and the consensus decision about the individual name may be used to label the electronic content item from which the individual name was identified. As such, the electronic content item may be used to train the classifier under supervised training. In some embodiments, after a predetermined number of broadcast decisions and consensus decisions, the classifier may be retrained to learn from recent examples to create an automated feedback loop for training.

There may be a variety of natural language processing machine learning classification algorithms that may be used to perform the classification. For example, some implementations include Naive Bayes Classifier, Linear Regression, or Support Vector Machines (SVM).

As an illustrative example, an electronic content item may include user-authored text that reads: "BREAKING: Bombing at Gas Station in Hometownville. Rob Yuhovurmony responsible for the bombing." Using the trained sentiment analysis machine learning classifier, and based at least in part on the text, the electronic content item may be classified as containing potential sanctions.

As another illustrative example, an electronic content item may include user-authored text that reads: "Sidney Banjo wins Nobel Peace prize for his efforts against terrorism." Using the trained sentiment analysis machine learning classifier, and based at least in part on the text, the electronic content item may be classified as not containing potential sanctions.

In some embodiments, the electronic content item may be further classified based on sentiment gathered from metadata of the electronic content item such as a timestamp, time zone, online post identification number, user identification number, user account screen name, user account holder name, user location (e.g., GPS location) at time of online post, user location at time of generation of the user-generated portion of online post (e.g., location where video or image in online post was captured), tweet URL, whether the user account is a verified account, follower count, friends count, favorites count, number of subscribers, retweets/favorites count, language of tweet, hashtags and/or user account profile image.

At operation 120, the system may determine/identify one or more individual names corresponding to the electronic content item. The system may identify the one or more individual names by performing an electronic textual analysis of text included in the electronic content item to extract the one or more individual names. For example, the text may include user-authored text and/or text from metadata of the electronic content item. In some embodiments, the system may identify the one or more individual names in response to a determination that the electronic content item has been classified as being associated with sanctionable conduct.

In some embodiments, a named entity recognizer (NER) may be utilized to extract the one or more individual names from the text using natural language processing. Several source libraries may be used to perform named entity recognition such as SpaCy and Stanford NER tagger. In some embodiments, the system may identify an alias name of the one or more individuals and compare the alias name to a database storing matching alias names to known individual names. As such, the system may be able to determine an actual name based on the alias name.

As an illustrative example, an electronic content item may be a tweet. The user-created content of the tweet may be text that reads: "BREAKING: Bombing at Gas Station in Hometownville. Rob Yuhovurmony responsible for the bombing." The system may extract the name "Rob Yuhovurmony" from the tweet.

At operation 122, the extracted one or more individual names and metadata (such as discussed above) may be converted into a standardized format for storage in a structured data store. In the embodiment shown in FIG. 1C, a data set stored in a structured data store 132 includes an identifier, an identified sanctioned name, an electronic content source, a user who generated the electronic content item on the electronic content source, a timestamp for creation of the electronic content item, and a verification status for the user. A verification status may be an indication that the user has proven their identity to a controlling entity for the electronic content source (e.g., a blue checkmark verification on Twitter).

At operation 124, the system may remove false positive data sets from the data store. The system may compare users (e.g., user accounts) who generated the electronic content items against a blacklist of users known to create false information on corresponding electronic content sources.

FIG. 1C shows an illustrative example of data store 132. In the illustrative example, user account "Fake News" may be on a blacklist for Facebook as "Fake News" has been determined to be a false information publisher on Facebook. "Fake News" may have posted on Facebook about "Jane Doe" and the system, according to the previous operations, may have stored Jane Doe and metadata associated with the Facebook post about Jane Doe to data store 132 as a data set. The system may remove false positives in the data store by comparing user accounts to blacklists for various electronic content sources. FIG. 1D shows data store 132 with data set identifier 3 removed from data store 132 because Jane Doe has been determined to be a false positive for an identified sanctionable individual since "Fake News" matched a blacklisted account from Facebook.

In some cases, the blacklists may be received from service providers associated with the electronic content sources. The blacklists may be lists generated by the service providers in various ways. For example, service providers may receive reports on a post by a user, where the reports are from other users who report that the user is generating false information on the platform of the electronic content source such as Facebook, Twitter, Instagram, etc.

At operation 126, the system calculates a confidence score for the one or more individual names of the data sets in the data store. The confidence score may indicate a level of confidence that a name is associated with a sanctionable person. The confidence score may be calculated based on frequency and recency. For example, how many posts, articles, or other electronic content items have been published about the identified sanctionable person as well how recent the posts, articles, or other electronic content items were published may be used to calculate the confidence score. For example, a number greater than a threshold number of posts about an individual within a short time frame may be used to calculate a higher confidence score than when there are fewer posts about the one or more individual names over a greater time frame. In calculating the confidence score, weight may be given to frequency and recency. Such weight may be adjusted to tune the confidence score calculation.

The confidence score may also be calculated based on metadata associated with the identified sanctionable person such as which electronic content source was used to identify the sanctionable person. As an example, more weight may be given to a Twitter tweet than a Facebook post such that an individual name identified through a Twitter tweet may have a greater confidence score than the same individual name identified through a Facebook post.

As another example, the confidence score may be calculated based on the diversity of sources that each instance of the individual name was identified from. For example, an individual's name that has been identified through Facebook, YouTube, Twitter, LinkedIn, and Instagram may have a greater confidence score than an individual name only identified from Snapchat.

In some embodiments, the calculated confidence score may be used to remove false positives. For example, individual names with a calculated confidence score below a predetermined threshold will be removed as false positives.

In various embodiments, the calculated confidence score may be used to boost an original confidence score given to the individual name from previous operations in process 101. For example, one or more previous operations of process 101 may be performed and one or more operations may tack on a confidence score amount to a confidence score for an individual name, then at operation 126, the calculated confidence score is added on to the accumulated confidence score from the other operations as a boost. The system may determine whether the boosted confidence score is below a predetermined threshold, and if so, the system may remove the corresponding individual name as a false positive.

As an illustrative example, after operation 120, the system may have a confidence score indicating that the one or more individual names identified are associated with a sanctionable person. For example, the confidence score may be 60% at this point. After operation 126, the calculated confidence score may be boosted to over 80% based on the frequency and recency calculation for example. Whether an individual name meets a particular confidence score threshold may dictate whether remedial actions are taken against a user of a financial transaction platform, such as transaction blocking, heightened account security requirements, and/or account restrictions.

At operation 128, the system adds the one or more individual names that were not removed as false positives to a sanction list. For example, the system may electronically store, in a database table, an indication that the names identified as individuals who may be subject to one or more sanction requirements. In some cases, the system may determine user accounts associated with the individual names. The system may place restrictions on the user accounts such as prohibiting one or more types of electronic transactions using a service provided by the system in response to the individual's names being placed on the sanction list.

At operation 130, the system broadcasts the individual's name and other data included in the dataset associated with the individual's name including metadata to a blockchain network for potential addition in a block in a blockchain.

In some embodiments, the blockchain network may be a private or permissioned blockchain network where service provider entities or investigation entities would add potentially sanctioned individuals. For a block to be validated and accepted into the blockchain, a proof of investigation model may be used where each participant in the blockchain would investigate data associated with a broadcasted individual and determine whether or not the data supports an affirmation that the individual name should be added to the blockchain as a sanctioned person.

After each participant (e.g., node) has broadcasted a decision, the broadcasted data node will either be accepted into the blockchain or discarded as a false positive according to some embodiments. In some cases, a consensus algorithm as discussed below may be used in determining whether broadcasted data will be included in a block of the blockchain.

Figure 2A:
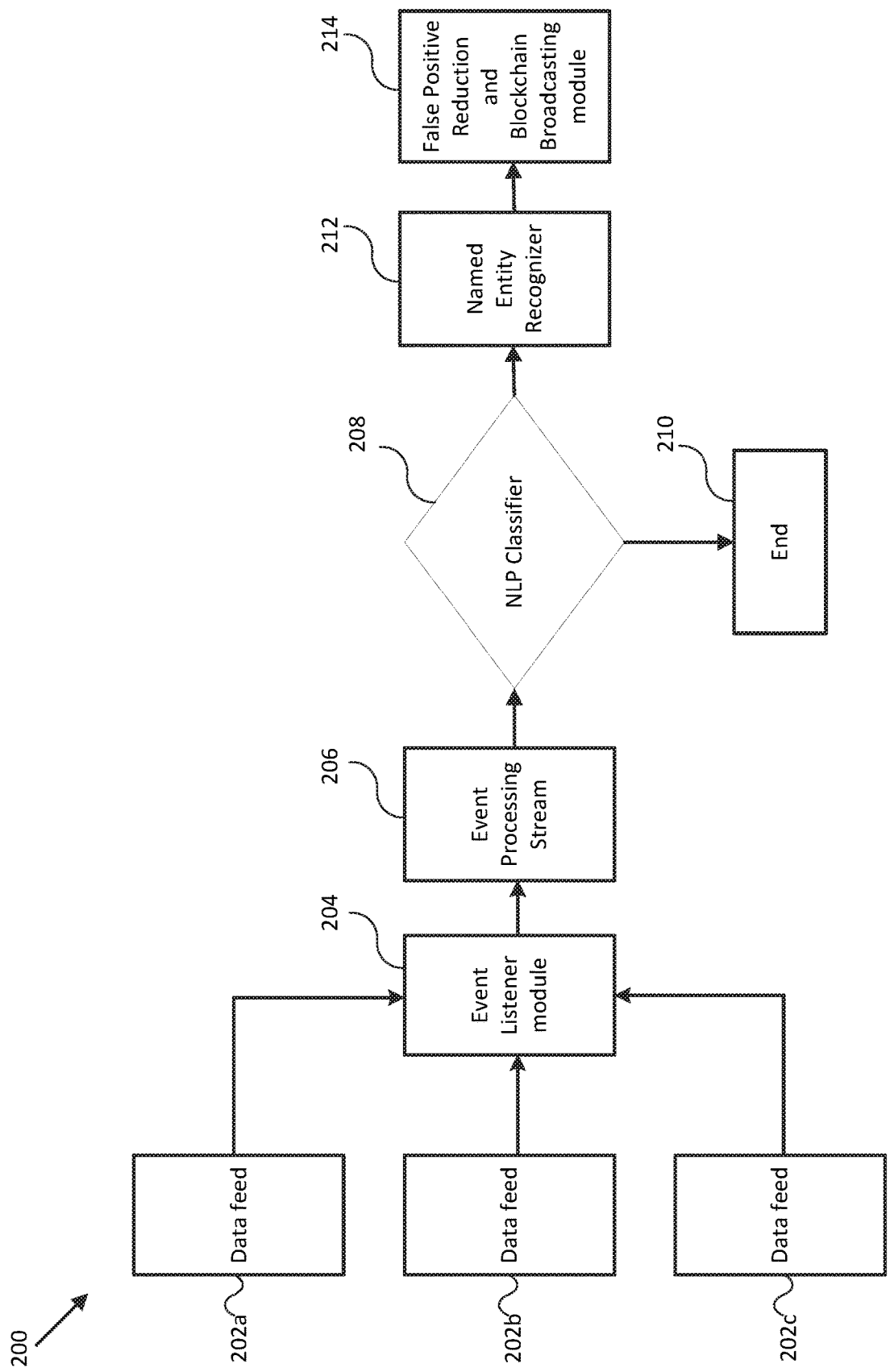
FIGS. 2A and 2B illustrate a flow diagram of a process for identifying sanctionable individuals in accordance with one or more embodiments of the present disclosure.

FIG. 2A illustrates a flow diagram of a process 200 for identifying sanctionable individuals in accordance with one or more embodiments of the present disclosure. In various embodiments, one or more operations of process 200 may be performed by service provider server 104, or any other computer system. In some embodiments, service provider server 104 may execute all operations indicated in FIG. 2A, while in other embodiments, all or part of one or more operations may be omitted.

According to some embodiments, an event listener module 204 may stream data feeds 202a-c. Event listener module 204 may perform operation 116 of process 101 of FIG. 1B in some embodiments. Each event may be recently posted electronic content item on a media platform. An event processing stream 206 may include a plurality of electronic content items that are streamed to natural language processing (NLP) classifier 208. NLP classifier 208 may classify each of the electronic content items of event processing stream 206 as either containing sanctionable conduct or not containing sanctionable conduct. In some embodiments, NLP classifier 208 may perform operation 120 of process 101 of FIG. 1B. In some embodiments, NLP classifier 208 may first determine a language of text in an electronic content item. Once the language of text has been determined, NLP classifier may access a library corresponding to the language to perform the classification of the electronic content item.

If an electronic content item is not classified as containing sanctionable conduct, it is removed 210 from further processing. If an electronic content item is classified as containing sanctionable conduct, it is provided as input to named entity recognizer 212. Named entity recognizer 212 may parse text of the electronic content item to determine one or more individual names associated with the electronic content item. Named entity recognizer may perform operation 120 of process 101 of FIG. 1B in some embodiments.

Figure 2B:
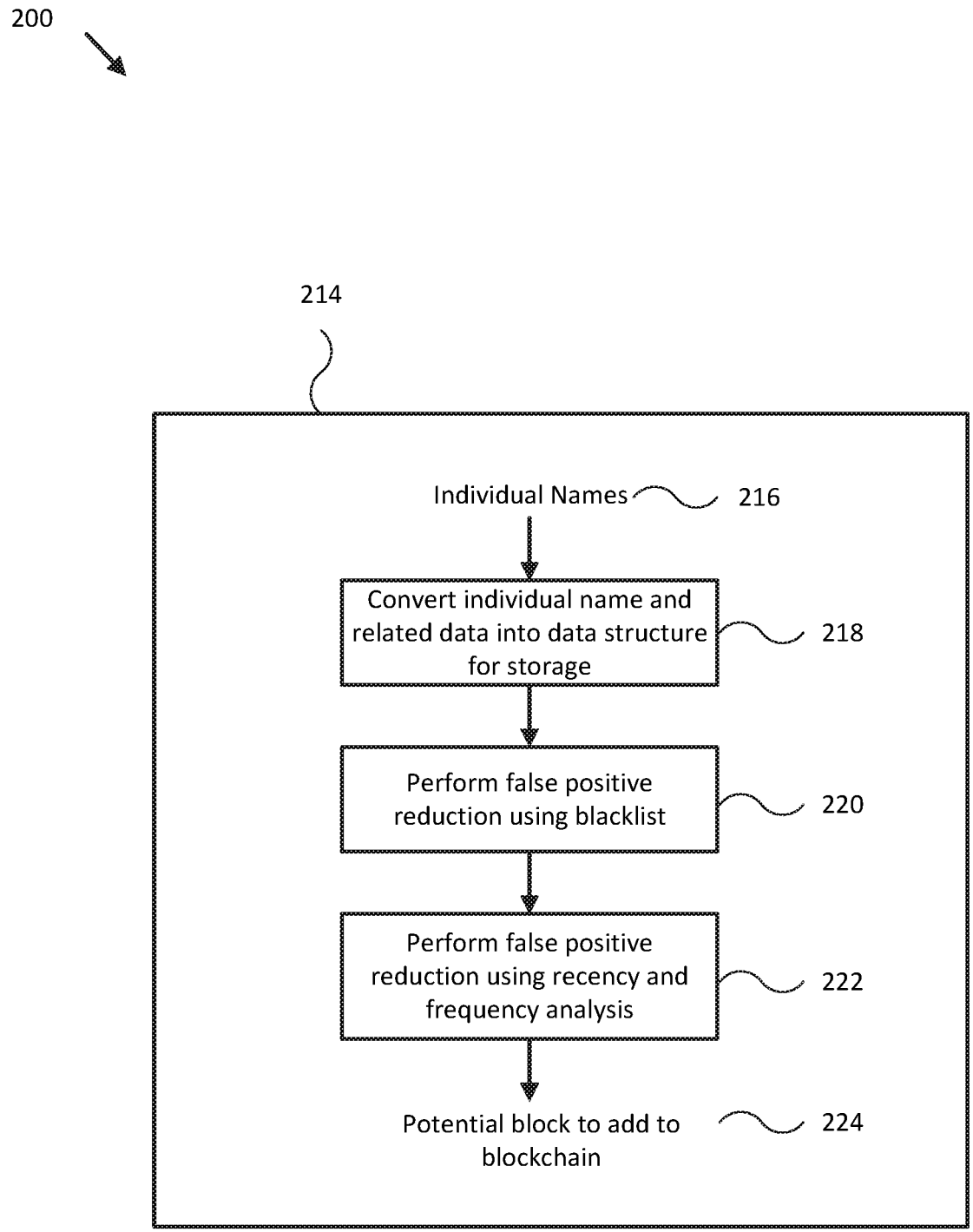

In various embodiments, individual names 216 determined by named entity recognizer 212 are passed to a false positive reduction and blockchain broadcasting module 214 as shown further in FIG. 2B. At block 218, module 214 may convert individual names 216 and related data from the electronic content item from which the name was derived into a format suitable for storage in a data store (e.g., data store 132 of FIG. 1C-1D). At block 220, module 214 performs false positive reduction using blacklists. For example, the user accounts that generated electronic content items from which the individual names were identified may be compared against blacklists received from electronic content source service providers. The blacklist may be a list of user accounts that are known by the electronic content source service provider to publish false information on the service provider's platform. If a user account matches a user account on the blacklist, module 214 may remove the individual's name identified from an electronic content item generated by the user account as a false positive in the data store.

At block 222, module 214 may perform false positive reduction using frequency and recency analysis. For example, module 214 may perform false positive reduction using frequency and recency analysis as discussed above at operation 126 of process 101 of FIG. 1B. Individual names that remain after false positive reduction may be broadcasted to a blockchain network as a potential block or potential inclusion in a block in a blockchain according to various embodiments.

Figure 3:
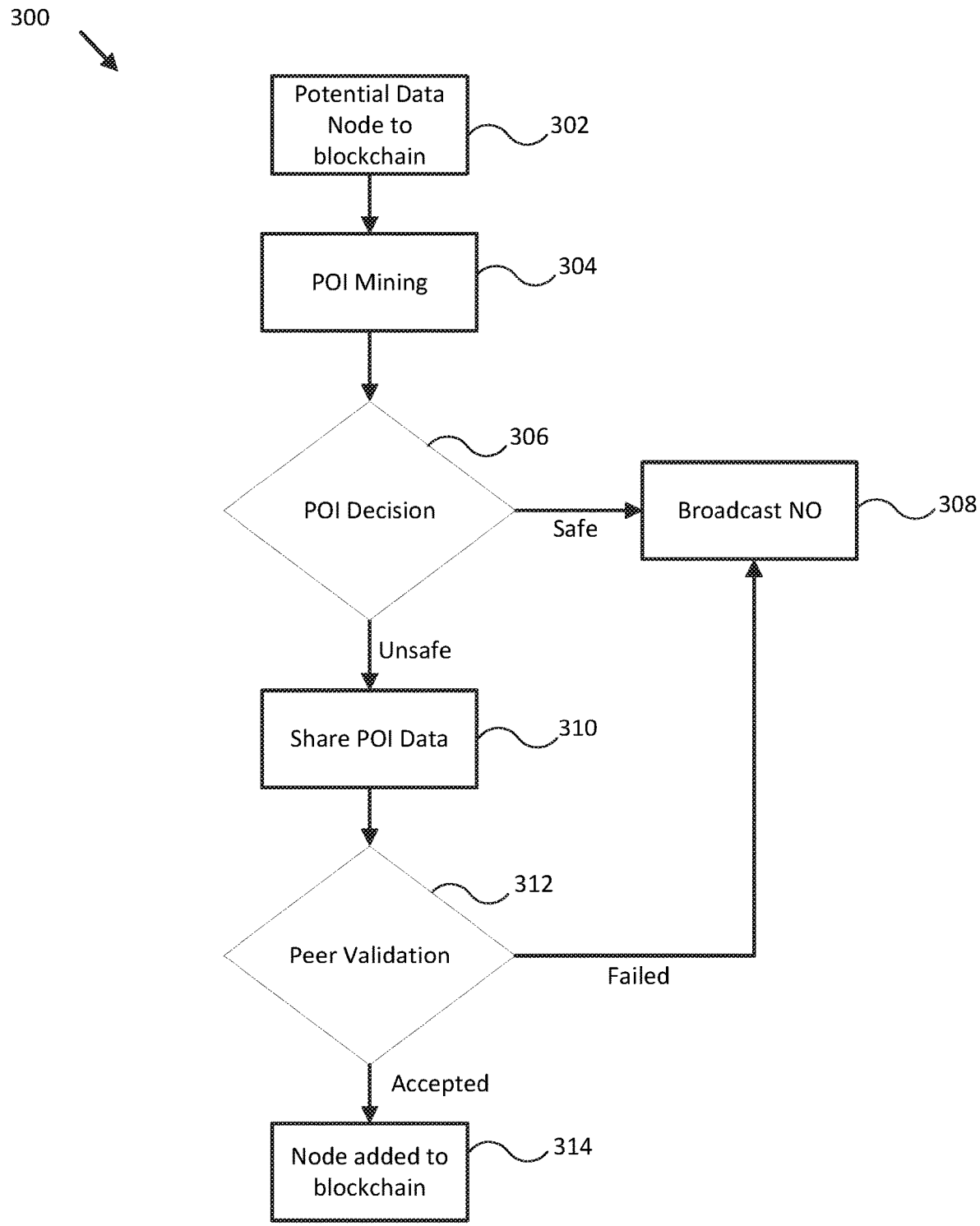
FIG. 3 illustrates a flow diagram of a process for adding a block to a blockchain in accordance with one or more embodiments of the present disclosure.

FIG. 3 illustrates a flow diagram of a process 300 for adding a block to a blockchain in accordance with one or more embodiments of the present disclosure. For explanatory purposes, process 300 is primarily described herein with reference to FIGS. 1A-2B; however, the process 300 is not limited to such figures. The operations of process 300 are described herein as occurring in serial, or linearly (e.g., one after another). However, multiple operations of process 300 may occur in parallel. In addition, the blocks of process 300 need not be performed in the order shown and/or one or more of the blocks of process 300 need not be performed (as is true for all flow diagrams herein). In various embodiments, one or more operations of process 300 may be performed by service provider server 104, or any other computer system. In some embodiments, service provider server 104 may execute all operations indicated in FIG. 3, while in other embodiments, all or part of one or more operations may be omitted.

At block 302, a potential data node may be broadcasted to a blockchain network. For example, a participant in the blockchain may have performed process 101 to determine an individual's name as a potentially sanctionable person. The participant may broadcast the individual's name, including data relevant to identifying the individual's name, to the blockchain network as a potential data node. In some embodiments, the individual's name and relevant data being broadcasted to the blockchain network may be a broadcast event.

At block 304, the participants in the blockchain network may validate the broadcast event according to proof of investigation mining. A participant may perform the proof of investigation mining by investigating whether the broadcasted individual's name is a sanctionable person. For example, the participant may use the individual's name and the data broadcasted to perform its own process (e.g., process 101 of FIG. 1B or another proprietary process) to decide as to whether the individual's name is associated with a sanctionable person. In another example, the participant may have its own proprietary process for determining whether the individual's name is associated with a sanctionable person. In yet another example, the participant may have already performed an independent investigation and independently identified the broadcasted individual's name, and need only confirm that the broadcasted individual's name matches a name of its own record of individuals' names.

At block 306, if the participant determines that, after its own investigation, that the individual's name is not associated with sanctionable conduct (depicted as "safe" in FIG. 3), then the participant may broadcast a "NO" decision to the other participants in the blockchain network at block 308 for the broadcast event.

If the participant determines that, after its own investigation, that the individual's name is associated with sanctionable conduct (depicted as "unsafe" in FIG. 3), then the participant may broadcast a "YES" decision at block 310. In various embodiments, the participant may share its investigation data with the other participants in the blockchain network at block 310 whether the participant makes a "YES" or "NO" broadcast decision.

At block 312, peer validation occurs in the blockchain network. For example, all participants in the blockchain may have broadcasted their respective decisions about the broadcast event to the blockchain network. According to one or more embodiments, a consensus algorithm may be used to determine whether the potential data node will be added to the blockchain at block 312.

In some embodiments, the consensus algorithm may be a weighted consensus algorithm. In an embodiment, the weighted consensus algorithm may operate as follows. Each participant in the blockchain network may have a decision reliability score based on their decision history. A consensus contribution score may be used to compute a score for each participant for each broadcast event (e.g., potential data node) based on the participant's decision reliability score and the participant's broadcast decision for the broadcast event. A node consensus score may be a cumulative score calculated based on a broadcast decision and decision reliability score from all participants in the blockchain network. A node acceptance score may be a threshold score where a node consensus score above the node acceptance score indicates that a data node will be accepted as a block in a blockchain.

In some cases, every participant in the blockchain network starts with a maximum decision reliability score. For example, if there are four participants (a, b, c, and d), each participant starts with a decision reliability score of 100 (100 being a maximum decision reliability score for this example).

When a participant broadcasts a "YES" decision, then the decision reliability score of the participant is used as a consensus contribution score for the participant. When a participant broadcasts a "NO" decision, then a difference between a maximum decision reliability score and the participant's decision reliability score is used as a consensus contribution score for the participant. For example, a participant with a decision reliability score of 100 that broadcasts a "YES" will have a consensus contribution score of 100. As another example, a participant with a decision reliability score of 80 that broadcasts a "YES" will have a consensus contribution score of 80. As another example, a participant with a decision reliability score of 100 that broadcasts a "NO" will have a consensus contribution score of 0. As another example, a participant with a decision reliability score of 80 that broadcasts a "NO" will have a consensus contribution score of 20.

A node consensus score may be calculated by first multiplying a decision reliability score (e.g., 100) of a top participant and multiplying it by the number of participants (e.g., 4) to determine a maximum node consensus score possible. The consensus contribution score from each participant may then be summed and divided by the maximum node consensus score to determine the node consensus score for a particular broadcast event.

If the node consensus score is greater than the node acceptance score, the data node is added to the blockchain at block 314. If the node consensus score is less than the node acceptance score, the data node is not added to the blockchain.

Figure 4:
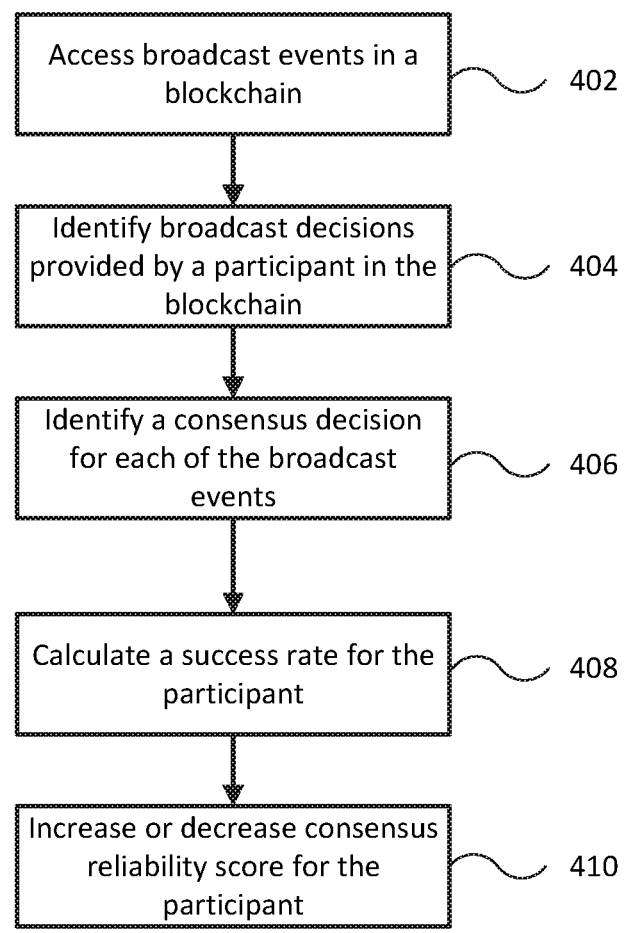
FIG. 4 illustrates a flow diagram of a process 400 for adjusting blockchain consensus reliability scores in accordance with one or more embodiments of the present disclosure.

FIG. 4 illustrates a flow diagram of a process 400 for adjusting blockchain consensus reliability scores in accordance with one or more embodiments of the present disclosure. For explanatory purposes, process 400 is primarily described herein with reference to FIGS. 1A-3; however, process 400 is not limited to such figures. The operations of process 400 are described herein as occurring in serial, or linearly (e.g., one after another). However, multiple operations of process 400 may occur in parallel. In addition, the operations of process 400 need not be performed in the order shown and/or one or more of the operations of process 400 need not be performed.

In some embodiments, a system (e.g., one or more servers) may act as a control layer in a blockchain network and govern the adjustment of consensus reliability scores for participants. For example, the blockchain network may be a private or permissioned blockchain in some embodiments. In some embodiments, process 400 for adjusting blockchain consensus reliability scores may be performed regularly such as periodically or according to a schedule. In other embodiments, process 400 may be automated to occur after a predetermined number of broadcast events have transpired. For example, after a threshold number of broadcast events have transpired, process 400 may be activated for the blockchain.

At operation 402 the system accesses broadcast events in a blockchain. The broadcast events may correspond to a historic period of time for the blockchain. For example, the accessed broadcast events may be a number broadcast events that occurred between a certain timeframe (e.g., past week, past month, past year, past hour, certain weeks, certain months, certain hours, etc.). In some embodiments, the broadcast events may be stored in the blockchain and the system may access such from the blockchain. In other embodiments, the system may have access to an external database outside of the blockchain where historic broadcast events including participant broadcast decisions are stored and made available for auditing purposes.

At operation 404, the system identifies broadcast decisions provided by a participant in the blockchain for each of the broadcast events. In some embodiments, the system may identify the participant's broadcast decisions by accessing an external database outside of the blockchain where historic broadcast decisions are stored and made available for auditing purposes. In some embodiments, the broadcast decisions may be stored in the blockchain and the system may access such from the blockchain.

At operation 406, the system identifies consensus decisions for each of the broadcast events. The consensus decisions may indicate whether there is a consensus among participants in the blockchain that a corresponding broadcast event should be added as a new node to the blockchain. In some embodiments, the system may identify the consensus decisions for each of the broadcast events by accessing an external database outside of the blockchain where historic consensus decisions are stored and made available for auditing purposes. In some embodiments, the consensus decisions may be stored in the blockchain and the system may access such from the blockchain.

At operation 408, the system calculates a success rate for the participant based on the identified broadcast decision provided by the participant for each of the broadcast events and the identified consensus decision for each of the broadcast events. For example, if the participant's broadcast decision of "YES" and the consensus decision was a "NO," then such instance would be a failure. If the participant's broadcast decision was "NO" and the consensus decision was "NO," then such instance would be a success. In other words, when the broadcast decision was the same as the consensus decision, such instance would be a success. Conversely when the broadcast decision was not the same as the consensus decision, then such instance would be a failure.

Accordingly, the success rate may be calculated by dividing the number of successful broadcast decisions by the total number of broadcast events (e.g., number of successes plus the number of failures).

At operation 410, based on the calculated success rate, the system increases or decreases a decision reliability score for the participant. For example, if the success rate is below a predetermined threshold (e.g., 70%), the decision reliability score for the participant is lowered by a predetermined amount. If the success rate is above the predetermined threshold, the decision reliability score for the participant may be raised by a predetermined amount up to a maximum decision reliability score. In some cases, the increase or decrease in decision reliability score may be correlated to ranges of success rate. For example, a success rate of 0-20% may equate to a decrease in decision reliability score of 40, a success rate of 21-60% may equate to a decrease in decision reliability score of 15, a success rate of 61-80% may equate to no change in decision reliability score, and a success rate of 81-100% may equate to an increase in decision reliability score of 30 (up to a maximum decision reliability score).

Reference is made to a single participant in process 400, however, process 400 may be performed for each participant in the blockchain. Subsequent to increasing or decreasing the decision reliability score for each participant, the system may determine that the top participant with the greatest reliability score is still less than a maximum (e.g., ceiling) decision reliability score. In such cases, the decision reliability score for each participant may be increased by an amount equal to a difference between the greatest reliability score for the top participant and the maximum decision reliability score. Boosting all participant's decision reliability scores as such may be needed to maintain sufficient decision reliability scores for the participants to reach a node acceptance score when node consensus scores are calculated for broadcast events. Otherwise, if participants are penalized to a point where all participants have low decision reliability scores, then it may be difficult to reach the node acceptance score to add new nodes to the blockchain even when all participants have broadcasted a "YES" decision.

In various embodiments, when a participant's decision reliability score is decreased to below a certain threshold, the participant may be suspended from participating in the blockchain. In some cases, suspending the participant may mean the participant can no longer access the blockchain. In other cases, suspending the participant may mean that the participant may still provide broadcast decisions for future broadcast events, but the broadcast decision provided by the participant for future broadcast events is not included in a computation of a node consensus score used to determine whether to add a new node to the blockchain.

As an illustrative example, there may be four participants in a blockchain (Participant A, Participant B, Participant C, and Participant D). Before process 400 for adjusting blockchain consensus reliability scores is performed, Participant A may have a decision reliability score of 100, Participant B may have a decision reliability score of 100, Participant C may have a decision reliability score of 100, and Participant D may have a decision reliability score of 100. A success rate for each participant may be determined according to operations 402-408 above. For example, Participant A may have a success rate of 50%, Participant B may have a success rate of 60%, Participant C may have a success rate of 80%, and Participant D may have a success rate of 80%. If the predetermined threshold for penalizing participants by decreasing decision reliability scores is 70%, then Participant A and Participant B may have their decision reliability scores decreases by a predetermined amount such as 10 for this example. There may be an incentive for Participant C and D for being above the threshold of an increase by 10 to their decision reliability score, but since Participant C and D are already at a maximum decision reliability score, their decision reliability scores will not change. Thus, after the adjustment, Participant A may have a decision reliability score of 90, Participant B may have a decision reliability score of 90, Participant C may have a decision reliability score of 100, and Participant D may have a decision reliability score of 100.

As another illustrative example, there may be four participants in a blockchain (Participant A, Participant B, Participant C, and Participant D). Before process 400 for adjusting blockchain consensus reliability scores is performed, Participant A may have a decision reliability score of 80, Participant B may have a decision reliability score of 80, Participant C may have a decision reliability score of 90, and Participant D may have a decision reliability score of 100. A success rate for each participant may be determined according to operations 402-408 above. For example, Participant A may have a success rate of 50%, Participant B may have a success rate of 60%, Participant C may have a success rate of 30%, and Participant D may have a success rate of 40%. If the predetermined threshold for penalizing participants by decreasing decision reliability scores is 70%, then each Participant A, B, C, and D may have their decision reliability scores decreased by a predetermined amount such as 10 for this example. Thus, after the adjustment, Participant A may have a decision reliability score of 70, Participant B may have a decision reliability score of 70, Participant C may have a decision reliability score of 80, and Participant D may have a decision reliability score of 90. In this case, the top participant (Participant D) has a decision reliability score of 90, which is below a maximum decision reliability score of 100, there may be a boost to each of the participant's score by a difference between the maximum decision reliability score of 100 and the top participant's score of 90. Thus, each participant will receive a boost to its score by 10. After the boost, Participant A may have a decision reliability score of 80, Participant B may have a decision reliability score of 80, Participant C may have a decision reliability score of 90, and Participant D may have a decision reliability score of 100. Now the top participant has the maximum decision reliability score. The boost may be needed so that the node acceptance score can be reached by the participants in new broadcast events. In other words, if the decision reliability scores of the participants are too low, their node consensus score for new broadcast events may not be enough to reach the node acceptance score even though the participants may all agree that a new data node should be added to the blockchain for the broadcast event.

Figure 5:
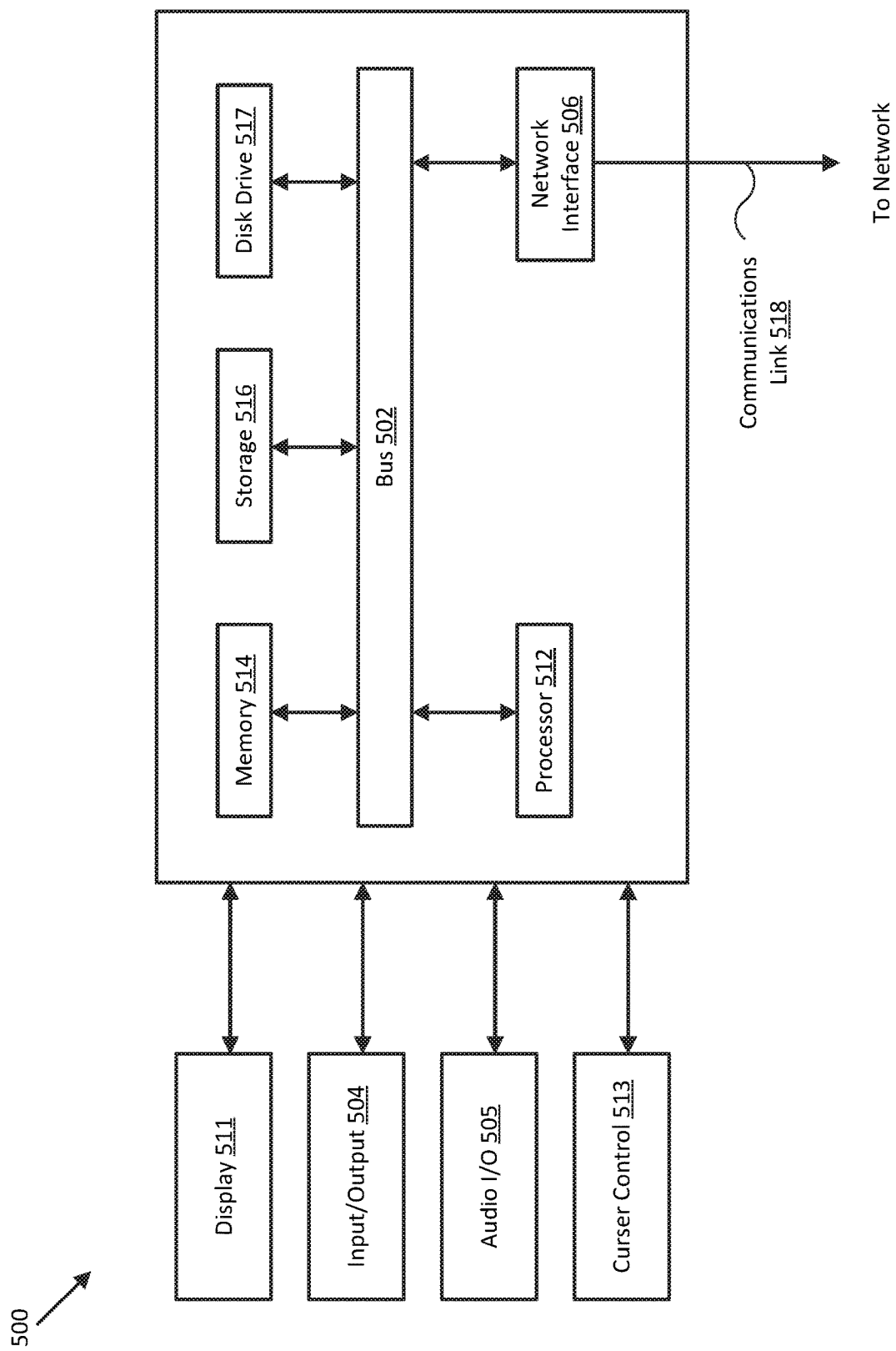
FIG. 5 illustrates a block diagram of a computer system in accordance with one or more embodiments of the present disclosure.

FIG. 5 illustrates a block diagram of a computer system 500 suitable for implementing one or more embodiments of the present disclosure. It should be appreciated that each of the devices discussed herein may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device or another server via a network (e.g., network 106 of FIG. 1A). In one embodiment, the transmission is wireless, although other transmission mediums and methods may also be suitable. Processor 512, which may be one or more hardware processors, can be a micro-controller, digital signal processor (DSP), or other processing component, processes these various signals, such as for display on computer system 500 or transmission to other devices via a communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer-readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system related to blockchain decision reliability score adjustment, comprising:
   a non-transitory memory; and
     one or more hardware processors coupled to the non-transitory memory and configured to read instructions from the non-transitory memory to cause the system to perform operations comprising:
       accessing broadcast events in a blockchain, wherein the broadcast events correspond to a historic period of time;
       identifying a broadcast decision provided by a participant in the blockchain for each of the broadcast events, the broadcast decision including an indication of whether an entity corresponding to the broadcast event contained sanctionable conduct that comprises a financial crime, a country-specific crime, or a type of conduct that leads to the entity being placed on a specified blacklist;

identifying a consensus decision for each of the broadcast events, wherein the consensus decision indicates whether there is a consensus among participants in the blockchain that a corresponding broadcast event should be added as a new node to the blockchain at least in part due to the corresponding broadcast event lacking the sanctionable conduct;

calculating a success rate for the participant based on the identified broadcast decision provided by the participant for each of the broadcast events and the identified consensus decision for each of the broadcast events, wherein the calculating the success rate comprises:

determining, for the broadcast events, a first number of times that the broadcast decision provided by the participant matches the consensus decision; and dividing the first number by a total number of broadcast events; and based on the success rate, increasing or decreasing a decision reliability score for the participant, wherein the decision reliability score comprises a weight applied to broadcast decisions provided by the participant in future broadcast events for the blockchain.

2. The system of claim 1, wherein the decision reliability score is decreased based on the success rate being below a predetermined threshold, wherein an amount that the decision reliability score is decreased by is a predetermined amount corresponding to the success rate being below the predetermined threshold.

3. The system of claim 1, wherein the decision reliability score is increased based on the success rate being above a predetermined threshold, wherein an amount that the decision reliability score is increased by is a predetermined amount corresponding to the success rate being above the predetermined threshold.

4. The system of claim 1, wherein the operations are performed for each participant in the blockchain.

5. The system of claim 4, wherein the operations further comprise:

subsequent to the increasing or decreasing the decision reliability score for each participant, determining that a greatest reliability score among the participants is less than a ceiling reliability score; and increasing the decision reliability score for each participant by an amount equal to a difference between the greatest reliability score and the ceiling reliability score.

6. The system of claim 1, wherein the success rate is within a range of a plurality of ranges, and wherein the decision reliability score is decreased or increased by an amount corresponding to the range.

7. The system of claim 1, wherein the decision reliability score for the participant is decreased based on the success rate, and wherein the operations further comprise suspending the participant from participating in the blockchain.

8. The system of claim 7, wherein the suspending the participant from participating in the blockchain allows for the participant to provide a broadcast decision for future broadcast events but the broadcast decision by the participant for future broadcast events is not included in a computation of a node consensus score used to determine whether to add a new node to the blockchain.

9. The system of claim 1, wherein the operations further comprise selecting the historic period of time based on a number of broadcast events that have transpired.

10. The system of claim 9, wherein the number of broadcast events that have transpired exceeds a predetermined threshold number of transpired broadcast events.

11. A method for adjusting blockchain participant reliability scores, the method comprising:

accessing broadcast events in a blockchain, wherein the broadcast events correspond to a selected past period of time;

identifying a broadcast decision provided by a participant in the blockchain for each of the broadcast events corresponding to the selected past period of time, the broadcast decision including an indication of whether an entity corresponding to the broadcast event contained sanctionable conduct that comprises a financial crime, a country-specific crime, or a type of conduct that leads to the entity being placed on a specified blacklist;

identifying a consensus decision for each of the broadcast events corresponding to the selected past period of time, wherein the consensus decision indicates whether there is a consensus among participants in the blockchain that the broadcast event should be added as a new node to the blockchain at least in part due to the corresponding broadcast event lacking the sanctionable conduct;

determining a success rate for the participant based on the identified broadcast decision provided by the participant for each of the broadcast events and the consensus decision for each of the broadcast events, wherein the success rate comprises a number of times that the broadcast decision provided by the participant matches the consensus decision divided by a total number of broadcast events; and based on the success rate, increasing or decreasing a decision reliability score for the participant, wherein the decision reliability score comprises a weight applied to broadcast decisions provided by the participant in future broadcast events for the blockchain.

12. The method of claim 11, wherein the decision reliability score is decreased based on the success rate being below a predetermined threshold.

13. The method of claim 12, further comprising suspending the participant from participating in the blockchain based on the decision reliability score being below a predetermined threshold indicating that a suspension is required.

14. The method of claim 11, wherein the decision reliability score is increased based on the success rate being above a predetermined threshold.

15. The method of claim 14, further comprising:

determining that the increased decision reliability score is a greatest reliability score amongst participants of the blockchain;

determining that the greatest reliability score is less than a ceiling reliability score for the blockchain; and increasing decision reliability scores corresponding to each participant in the blockchain by an amount equal to a difference between the ceiling reliability score and the greatest reliability score.

16. A non-transitory machine-readable medium having stored thereon machine-readable instructions executable to cause a machine to perform operations comprising:

identifying historic broadcast events in a blockchain;

identifying a broadcast decision provided by a participant in the blockchain for each of the historic broadcast events, wherein the broadcast decision comprises a determination made by the participant whether a corresponding broadcast event should be added as a new node to the blockchain, the broadcast decision including an indication of whether an entity corresponding to the broadcast event contained sanctionable conduct that comprises a financial crime, a country-specific crime, or a type of conduct that leads to the entity being placed on a specified blacklist;

identifying a consensus decision for each of the historic broadcast events, wherein the consensus decision indicates whether there is a consensus among participants in the blockchain that the broadcast event should be added as a new node to the blockchain at least in part due to the corresponding broadcast event lacking the sanctionable conduct;

determining, for the historical broadcast events, a first number of times that the broadcast decision provided by the participant matches the consensus decision;

determining a success rate for the participant at least in part by dividing the first number by a total number of the historic broadcast events;

based on the success rate, decreasing a decision reliability score for the participant, wherein the decision reliability score comprises a weight applied to broadcast decisions provided by the participant in future broadcast events for the blockchain;

determining that the decision reliability score for the participant is a greatest decision reliability score among all participants in the blockchain;

determining that the greatest decision reliability score is less than a ceiling decision reliability score for the blockchain; and increasing the decision reliability score corresponding to each participant in the blockchain by an amount equal to a difference between the ceiling decision reliability score and the greatest decision reliability score.

17. The non-transitory machine-readable medium of claim 16, wherein the operations further comprise subsequent to the increasing the decision reliability scores corresponding to each participant in the blockchain, suspending another participant from participating in the blockchain based on the decision reliability score corresponding to the another participant being below a predetermined threshold indicating that a suspension is required.

18. The non-transitory machine-readable medium of claim 16, wherein the decision reliability score is decreased in correlation to the success rate.

19. The non-transitory machine-readable medium of claim 16, wherein decision reliability score is decreased by an amount corresponding to a range of a plurality of ranges, wherein each range has an indication of whether to increase or decrease and a corresponding amount.

20. The non-transitory machine-readable medium of claim 16, wherein the identifying the historic broadcast events in a blockchain is performed according to a scheduled audit frequency.

* * * * *